United States Patent
Ahuja et al.

(10) Patent No.: US 10,455,301 B2
(45) Date of Patent: Oct. 22, 2019

(54) METHOD TO RE-PROVISION BANDWIDTH IN P-OTN NETWORK BASED ON CURRENT TRAFFIC DEMAND

(71) Applicant: Infinera Corp., Annapolis Junction, MD (US)

(72) Inventors: Satyajeet Ahuja, Cupertino, CA (US); Ping Pan, San Jose, CA (US); Rajan Rao, Fremont, CA (US); Biao Lu, Saratoga, CA (US)

(73) Assignee: Infinera Corporation, Sunnyvale, CA (US)

( * ) Notice: Subject to any disclaimer, the term of this patent is extended or adjusted under 35 U.S.C. 154(b) by 15 days.

(21) Appl. No.: 13/931,439

(22) Filed: Jun. 28, 2013

(65) Prior Publication Data

US 2014/0199067 A1 Jul. 17, 2014

Related U.S. Application Data

(60) Provisional application No. 61/753,890, filed on Jan. 17, 2013.

(51) Int. Cl.
*H04J 14/00* (2006.01)
*H04L 12/26* (2006.01)
*H04L 12/56* (2006.01)
*H04B 7/212* (2006.01)
*H04Q 11/00* (2006.01)

(52) U.S. Cl.
CPC .............................. *H04Q 11/0066* (2013.01)

(58) Field of Classification Search
USPC ........................ 398/47, 52, 75; 370/230, 468
See application file for complete search history.

(56) References Cited

U.S. PATENT DOCUMENTS

| | | | | |
|---|---|---|---|---|
| 5,353,285 A | * | 10/1994 | Van Der Plas | H04J 3/1694 370/443 |
| 7,197,048 B1 | * | 3/2007 | Duffield | H04L 12/4641 370/231 |
| 7,907,526 B2 | * | 3/2011 | Kolenchery | H04L 12/28 370/232 |
| 8,547,981 B2 | * | 10/2013 | Wood | H04L 45/50 370/395.32 |
| 2005/0198370 A1 | * | 9/2005 | Miller | H04L 63/0272 709/238 |
| 2006/0050665 A1 | * | 3/2006 | Bruckman | H04L 12/42 370/329 |
| 2007/0091804 A1 | * | 4/2007 | Pan | H04L 45/00 370/230 |
| 2008/0037425 A1 | * | 2/2008 | Pan | H04L 29/06027 370/235 |

(Continued)

*Primary Examiner* — David C Payne
*Assistant Examiner* — Pranesh K Barua
(74) *Attorney, Agent, or Firm* — David L. Soltz

(57) ABSTRACT

A method, comprises measuring, by circuitry of a computer system, a first bandwidth of data traffic of a transport path over a time period, the transport path passing through a plurality of nodes and conforming to a protocol using a number of time slots to allocate a second bandwidth to the transport path. The method further includes passing a signal, from the computer system to at least one of the nodes of the transport path, the signal including at least one instruction that when executed by circuitry of the at least one node causes a change to the number of time slots allocated to the transport path.

13 Claims, 9 Drawing Sheets

(56) References Cited

U.S. PATENT DOCUMENTS

| | | | | |
|---|---|---|---|---|
| 2008/0037985 A1* | 2/2008 | Shi | ............... | H04L 41/0896 398/45 |
| 2008/0151768 A1* | 6/2008 | Liu | ............... | H04L 41/0816 370/252 |
| 2010/0002580 A1* | 1/2010 | DelRegno | ......... | H04L 41/0896 370/230 |
| 2010/0002724 A1* | 1/2010 | Turlington | ......... | H04L 12/4633 370/468 |
| 2010/0110907 A1* | 5/2010 | Kotrla | ............... | H04L 43/0882 370/252 |
| 2010/0214913 A1* | 8/2010 | Kompella | ............ | H04L 45/125 370/230 |
| 2012/0082456 A1* | 4/2012 | Su | ............... | H04J 3/1652 398/58 |
| 2012/0163812 A1* | 6/2012 | Youn | ............... | H04J 3/1658 398/45 |
| 2012/0224857 A1* | 9/2012 | Su | ............... | H04J 3/1652 398/98 |
| 2013/0114416 A1* | 5/2013 | Rao | ............... | H04L 43/10 370/241 |
| 2013/0216230 A1* | 8/2013 | Tajima | ............... | H04J 14/08 398/75 |
| 2013/0336126 A1* | 12/2013 | Vasseur | ............... | H04L 41/147 370/236 |
| 2014/0044431 A1* | 2/2014 | Hussain | ............ | H04J 14/0227 398/79 |
| 2014/0079402 A1* | 3/2014 | Sharma | ............... | H04J 14/08 398/98 |

\* cited by examiner

METHOD TO RE-PROVISION BANDWIDTH IN P-OTN NETWORK BASED ON CURRENT TRAFFIC DEMAND

INCORPORATION BY REFERENCE

The present patent application claims priority to the provisional patent application identified by U.S. Ser. No. 61/753,890 titled "A method to reprovision bandwidth in P-OTN network based on current traffic demand," filed on Jan. 17, 2013, the entire content of which is hereby incorporated herein by reference.

FIELD OF THE DISCLOSURE

The disclosure generally relates to methods that facilitate dynamic reprovisioning of bandwidth in packet optical transport networks (P-OTN or P-OTNs). More particularly, the disclosure relates to measuring incoming IP-traffic data rate at a headend node of an OTN network, and dynamically reprovisioning (e.g., increasing or decreasing) reserved bandwidth of a transport pipe (e.g., a label switched path) in the OTN network when the incoming IP-traffic data rate varies more than a preset threshold amount over a preset period of time. Though the methodologies set forth herein are in the context of traffic engineering of packet based traffic over OTN networks, such methodologies may be applied to any interface/network that carries variable bandwidth traffic and supports transport pipes or paths with dynamically adjustable bandwidths.

BACKGROUND

Traffic engineering (TE) is a technology that is concerned with performance optimization of operational networks. In general, TE includes a set of applications mechanisms, tools, and scientific principles that allow for measuring, modeling, characterizing and control of user data traffic in order to achieve specific performance objectives.

Multiprotocol label switching (MPLS) is a scheme in a high-performance telecommunication network which directs and carries data from one node to the next node in the network. In MPLS, labels are assigned to data packets, and packet forwarding decisions from one node to the next node in the network are made based on the contents of the label for each data packet, without the need to examine the data packet itself.

Generalized Multiprotocol Label Switching (GMPLS) is a type of protocol which extends MPLS to encompass network schemes based upon time-division multiplexing (e.g. SONET/SDH, PDH, G.709), wavelength multiplexing, and spatial switching (e.g. incoming port or fiber to outgoing port or fiber). Multiplexing, such as time-division multiplexing is when two or more signals or bit streams are transferred over a common communication link. In particular, time-division multiplexing (TDM) is a type of digital multiplexing in which two or more signals or bit streams are transferred as sub-channels in one communication link, but are physically taking turns on the communication link. The time domain is divided into several recurrent timeslots of fixed length, one for each sub-channel. After the last sub-channel, the cycle starts over again. Time-division multiplexing is commonly used for circuit mode communication with a fixed number of communication links and constant bandwidth per link. Time-division multiplexing differs from statistical multiplexing, such as packet switching, in that the timeslots are returned in a fixed order and preallocated to the channels, rather than scheduled on a packet by packet basis.

An Optical Transport Network (OTN) is comprised of a plurality of switch nodes linked together to form the OTN. The OTN includes an electronic layer and an optical layer. The electronic layer and the optical layer each contain multiple sub-layers. The optical layer provides optical connections between the nodes, also referred to as optical channels or lightpaths, to other layers, such as the electronic layer. The optical layer performs multiple functions, such as monitoring network performance, multiplexing wavelengths, and switching and routing wavelengths. In general, OTNs are a combination of the benefits of SONET/SDH technology and wave division multiplexing (WDM) or dense wavelength-division multiplexing (DWDM) technology (optics). OTN structure, architecture, and modeling are further described in the International Telecommunication Union recommendations, including ITU-T G.709, ITU-T G.872, and ITU-T G.805, which are well known in the art.

The optical transport hierarchy (OTH) of OTNs supports the operation and management aspects of OTNs of various architectures, e.g., point-to-point, ring, and mesh architectures. One part of the optical transport hierarchy is a multiplex hierarchy, which is a hierarchy including an ordered repetition of tandem digital multiplexers that produce signals of successively higher data rates at each level of the hierarchy. Multiplexing hierarchy may be specified by way of optical channel data units, i.e., ODUj, where j varies from 0 to 4; and optical channel transport units, i.e., OTUk, where k varies from 1 to 4. The optical channel data units refer to a frame format for transmitting data which can be either fixed in the data rate or the data rate can be arbitrarily set.

Examples of optical channel data units that are fixed in the amount of data and data rate include those specified by ODU0, ODU1, ODU1e, ODU2, ODU2e, ODU3, ODU3e1, ODU3e2, and ODU4. An example of an optical channel data unit in which the data rate can be arbitrarily set is referred to in the art as ODUflex, which allows adjustments to the size of the ODUflex by adding or removing timeslots.

The optical channel data units within the multiplexing hierarchy are referred to in the art as lower order or higher order. A higher order optical channel data unit refers to a server layer to which a lower order optical channel data unit (client layer) is mapped to. Optical channel data units include a parameter referred to as tributary slot granularity which refers to a data rate of the timeslots within the optical channel data unit. The tributary slot granularity of optical channel data units include time slots of approximately 1.25 Gbit/s or 2.5 Gbit/s. OPUk (when k=1, 2, 3, 4) is divided into equal sized Tributary Slots or Time Slots of granularity (1.25G or 2.5G) to allow mapping of lower order ODUj (where j<k). For example: On OPU4, there are 80 (1.25G) Tributary Slots. To map: ODU3 into OPU4=>31 TSs are used; ODU2/2e into OPU4=>8 TS are used; ODU1 into OPU4=>2 TSs are used; and ODU0 into OPU4=>1 TS is used.

Multi-stage ODU multiplexing, refers to an OTN multiplexing hierarchy in which an ODUi container can first be multiplexed into a higher order ODUj container, which is then multiplexed into a higher order-ODUk container. A single-stage multiplexing refers to one lower order ODUj multiplexed into a higher order ODUk. The single stage ODU multiplexing can be heterogeneous (meaning lower order ODUj of different rates can be multiplexed into a higher order ODUk).

OTNs support switching at two layers: (i) ODU Layer, i.e., time division multiplexing and (ii) OCH Layer—Lambda or wavelength switching where OCH stands for Optical Channel. The nodes in the OTN may support one or both the switching types. When multiple switching types are supported Multi-Layer Network (MLN) based routing as described in [RFC5339] is assumed.

Bandwidth is the data transfer capacity of a link, path, or connection, which may be expressed in optical data units, bits per second, number of time slots, or expressed by other methods. The bandwidth for fixed ODU rates can be advertised as a number of containers. The bandwidth for variable ODU rates such as ODUflex can be advertised as a data rate, such as bytes/second and/or as a number of timeslots. The TE-link bandwidth information can be saved in a link state database and used for computing routes or paths in the OTN for setting up optical channel data unit label switched paths in networks having multiple nodes communicating via communication links.

Currently, IP traffic (e.g., including user packet flows) is transported over P-OTN networks using OTN or WDM/DWDM pipes (e.g., label switched paths), such as via one or more ODU containers which are transported through the OTN via a label switched path (e.g., using GMPLS) typically setup by a headend node. The OTN typically statically provisions WDM/DWDM pipes by reserving a certain amount of bandwidth, e.g., by statically provisioning label switch paths in the OTN based on a connection setup signal transmitted by a headend node which measures maximum traffic over an incoming IP link. Additional bandwidth may be reserved or allocated if measured maximum IP-traffic increases above the measured maximum traffic.

However, existing static methodologies for bandwidth provisioning are lacking in several aspects. Because IP links do not carry the maximum measured traffic all the time, static bandwidth provisioning models currently result in OTN transport pipes or paths being underutilized for a large portion of the time, by not fully utilizing the reserved time slots for a particular transport path when IP-traffic with a rate lower than the maximum measured rate is carried by the transport paths. This uses up timeslots and bandwidth in the OTN that may be used by users for other services, or may be sold to other users by the network operator.

SUMMARY

In one aspect, the inventive concepts disclosed herein are directed to a method, including the steps of: (1) measuring, by circuitry of a computer system, a first bandwidth of data traffic of a transport path over a time period, the transport path passing through a plurality of nodes and conforming to a protocol using a number of time slots to allocate a second bandwidth to the transport path; and (2) passing a signal, from the computer system to at least one of the nodes of the transport path, the signal including at least one instruction that when executed by circuitry of the at least one node causes a change to the number of time slots allocated to the transport path.

The computer system may be a component of at least one of the nodes of the transport path. The circuitry of the computer system may be a component of a control plane of the at least one node, and the signal may conform to requirements of a GMPLS message. The step of passing the signal may be responsive to a determination that the first bandwidth differs from the second bandwidth by an amount exceeding a preset threshold, which threshold may be between about 0.1% and about 100%.

The time period may be a first time period, and the method may also include the step of measuring, by circuitry of the computer system, a third bandwidth of data traffic of the transport path over a second time period, and the step of passing the signal may be responsive to a determination that the first bandwidth differs from the third bandwidth by an amount exceeding a preset threshold, which threshold may be between about 0.1% and about 100%.

The protocol of the transport path may include a requirement for at least one variable bandwidth container, and the step of passing the signal may also include the signal having at least one instruction that when executed by the at least one of the nodes of the transport path causes the at least one of the nodes of the transport path to perform at least one of adding at least one timeslot to the at least one variable bandwidth container and removing at least one timeslot from the at least one variable bandwidth container. The variable bandwidth container may conform to requirements of an ODUflex container. The signal may conform to requirements of a GMPLS message.

The circuitry of the computer system may be a component of a network controller coupled with the at least one node of the plurality of nodes, and the signal may conform to requirements of a GMPLS message.

In another aspect, the inventive concepts disclosed herein are directed to a node, including an input interface for receiving traffic from a first link, an output interface for transmitting traffic to a second link, a switch for communicating the traffic from the input interface to the output interface, and a control module controlling the input interface, the output interface, and the switch. The control module may measure a first bandwidth of data traffic of a transport path over a time period, the transport path passing through a plurality of nodes and conforming to a protocol using a number of time slots to allocate a second bandwidth to the transport path. The control module may also pass a signal, from the node to at least one of the plurality of nodes of the transport path, the signal including at least one instruction that when executed by circuitry of the at least one of the plurality of nodes causes a change to the number of time slots allocated to the transport path. The node may pass the signal in response to a determination that the first bandwidth differs from the second bandwidth by an amount exceeding a preset threshold, which may be between about 0.1% and about 100%.

The time period may be a first time period, and the control module may further measure a third bandwidth of data traffic of the transport path over a second time period, and may pass the signal in response to a determination that the first bandwidth differs from the third bandwidth by an amount exceeding a preset threshold, which threshold may be between about 0.1% and about 100%.

The protocol of the transport path may include a requirement for at least one variable bandwidth container, and the signal may include at least one instruction that when executed by at least one of the plurality of nodes causes the at least one of the plurality of nodes to perform at least one of adding at least one timeslot to the at least one variable bandwidth container and removing at least one timeslot from the at least one variable bandwidth container. The variable bandwidth container may conform to requirements of an ODUflex container. The signal may conform to requirements of a GMPLS message.

The control module of the node may be a component of a control plane of the node, and the signal may conform to requirements of a GMPLS message. The control module may be a component of a network controller coupled with the at least one node of the plurality of nodes, and the signal may conform to requirements of a GMPLS message. The step of adjusting the bandwidth of the transport path may be carried out by the network controller via a control message transmitted to at least one node on the plurality of nodes.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements.

The inventive concepts disclosed herein are generally directed to a method of transport bandwidth provisioning, and to nodes and networks utilizing the method to dynamically reprovision bandwidth depending on incoming traffic bandwidth demands. In some exemplary embodiments, where IP traffic is transported over P-OTN pipes (or transport paths), a P-OTN node (e.g., a headend node and/or a packet-optical device) measures the bandwidth of the traffic on an incoming IP link, and adjusts line-side bandwidth allocation based on the bandwidth of the incoming traffic. The line-side bandwidth adjustment may be transparent to higher layers in the OTN. The IP link bandwidth may be measured as peak and/or average traffic over a specified time period (e.g., varying from a few seconds to several minutes), and/or may be measured continuously, periodically, or intermittently, for example. Re-provisioning or re-optimization of transport path bandwidth may be carried out based on a threshold based approach (e.g., a user or network provider specified threshold), so that when the measured IP link bandwidth differs from the transport path bandwidth by a preset threshold the transport path bandwidth may be adjusted.

In some exemplary embodiments, a method according to the inventive concepts disclosed herein may include measuring and storing incoming packet traffic bandwidth at time T1, by a packet-optical device, such as a headend node. At a second time T2 (T2 being later than T1), the user packet traffic may be measured, and the headend node may compute user packet traffic bandwidth in terms of peak and/or average bandwidth for the period T1-T2. The headend node may dynamically adjust the bandwidth of the transport path (e.g., an optical label switched path or connection) according to the newly measured incoming traffic pattern. The method may adjust the connection via the control-plane by triggering protocols conforming to GMPLS requirements to modify the existing transport path, and/or via the data-plane by using protocols conforming to ODUflex requirements to adjust the optical connection. Adjustment of optical connection (ODUflex) can be initiated by a head-end node, by measuring traffic and initiating bandwidth resizing if requested to be carried out (e.g., by using a control plane conforming to GMPLS requirements), or by notifying a network controller (e.g., using protocols conforming to SDN and/or GMPLS requirements), which network controller may initiate resizing of the transport path if requested.

Figure 1:
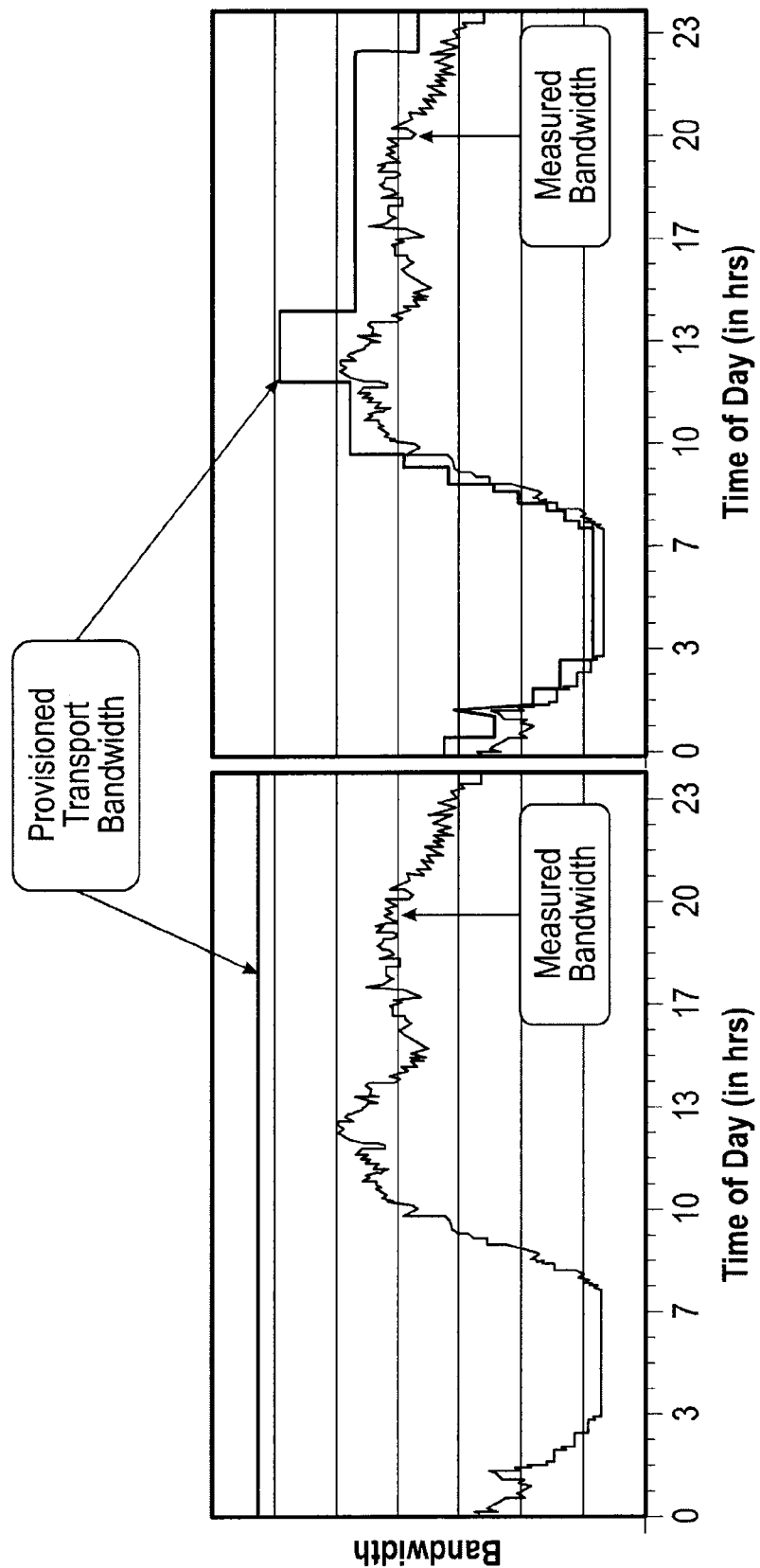
FIG. 1 is a graph comparing an existing method of static bandwidth provisioning in a P-OTN network with an exemplary method of dynamic bandwidth reprovisioning according to the inventive concepts disclosed herein.

Bandwidth provisioning methods according to the inventive concepts disclosed herein result in significant bandwidth savings as compared to existing static bandwidth provisioning methods. The inventive concepts disclosed herein overcome the underutilization of available bandwidth of static bandwidth provisioning by dynamically reprovisioning bandwidth according to measured incoming traffic. For example, as shown in FIG. 1, dynamic bandwidth provisioning methods according to the inventive concepts disclosed herein free up a significant amount of bandwidth that would be otherwise unused by preexisting static bandwidth provisioning. As shown in the left-hand side of FIG. 1, existing methods typically provide fixed bandwidth or capacity by assuming a certain percent loading (80% in this case) over the maximum measured traffic. In contrast, as shown in the right-hand side of FIG. 1, methods according to the inventive concepts disclosed herein attempt bandwidth reprovisioning periodically (e.g., every 5 minutes) and reprovisioning is triggered if the previous bandwidth allocation differs from the new allocation by a preset threshold (e.g., between about 0.1% and 100%).

Definitions

If used throughout the description and the drawings, the following short terms have the following meanings unless otherwise stated:

GMPLS stands for Generalized Multi-Protocol Label Switching which extends Multi-Protocol Label Switching to encompass time-division (for example, SONET/SDH, PDH, G.709), wavelength (lambdas), and spatial multiplexing (e.g., incoming port or fiber to outgoing port or fiber). The GMPLS framework includes a set of routing protocols which runs on a control module. The Generalized Multiprotocol Label Switching architecture is defined, for example in RFC 3945.

IETF Stands for Internet Engineering Task Force.

IP stands for Internet Protocol which is a protocol used for communicating data across a packet-switched network using the Internet Protocol Suite, also referred to as TCP/IP.

LSP stands for Label Switched Path, which is a transport path through a Generalized Multi-Protocol Label Switching network. Note that Label Switched Paths can be bidirectional or unidirectional, and may enable packets to be label switched through the Multiprotocol Label Switched network from a port on an ingress node (which can be called a headend node) to a port on an egress node (which can be called a tailend node).

MPLS stands for multi-protocol label switching which is a scheme in telecommunications networks for carrying data from one node to the next node. MPLS operates at an OSI model layer that is generally considered to lie between traditional definitions of layer 2 (data link layer) and layer 3 (network layer) and is thus often referred to as a layer 2.5 protocol.

OSC stands for Optical Supervisory Channel which is an additional wavelength that normally carries network management information within an optical network.

OTN stands for Optical Transport Network which includes a set of optical switch nodes which are connected by optical fiber links. ITU-T recommendations G.709 and G.872 define OTN interface requirements and network architecture respectively.

SONET/SDH stands for Synchronous Optical Networking/Synchronous Digital Hierarchy which are standardized multiplexer protocols that transfer multiple digital bit streams over optical fiber using lasers or light emitting diodes.

TE stands for traffic engineering which is a technology that is concerned with performance optimization of operational networks. In general, TE includes a set of applications mechanisms, tools, and scientific principles that allow for measuring, modeling, characterizing and control of user data traffic in order to achieve specific performance objectives.

DESCRIPTION

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Figure 2:
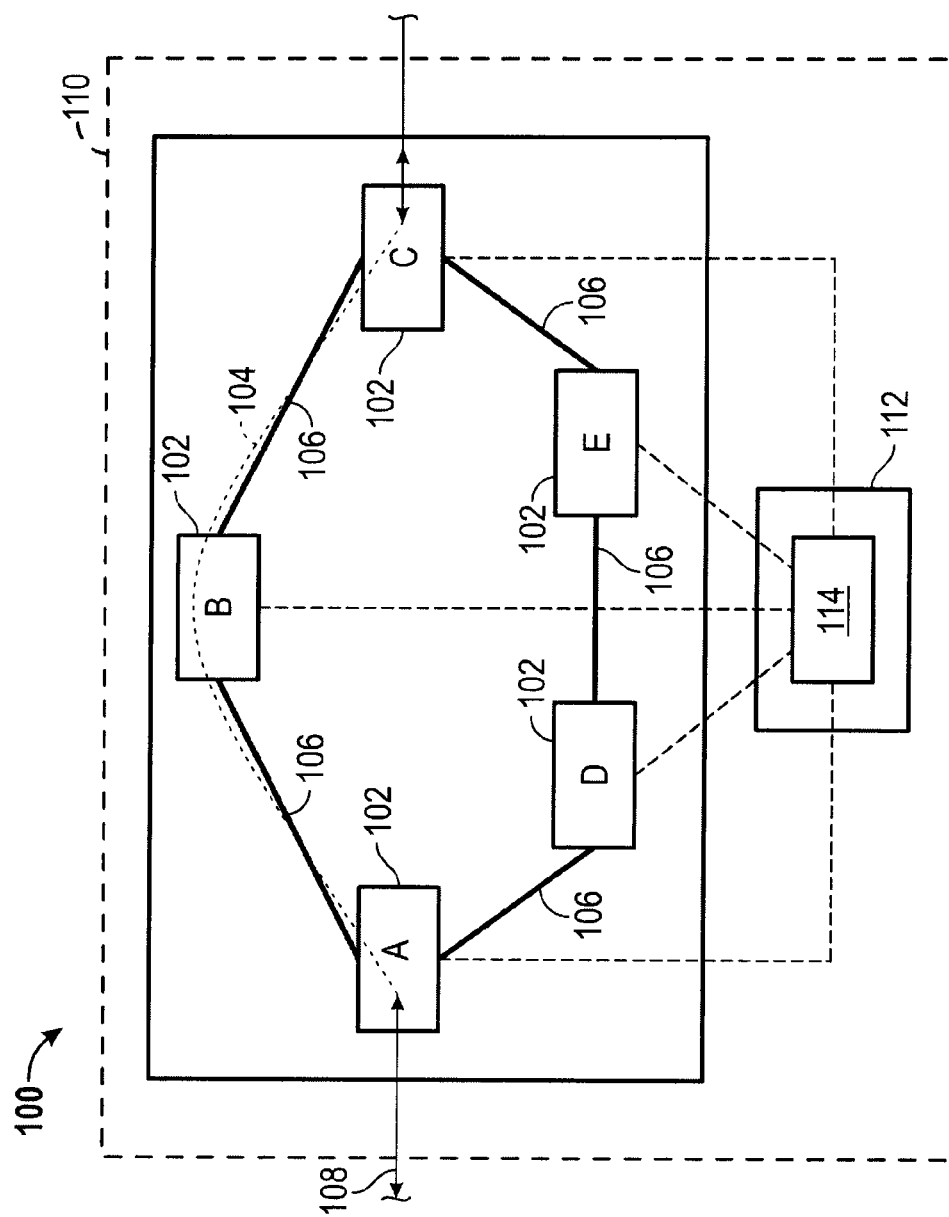
FIG. 2 is a block diagram of an exemplary P-OTN network according to the inventive concepts disclosed herein.

Referring now to the drawings and in particular to FIG. 2, an exemplary embodiment of a network 100 according to the inventive concepts disclosed herein includes nodes 102 labeled as A, B, C, D, and E. Some of the nodes 102 are denoted as a headend node 102A or tailend node 102C for a particular transport path in accordance to the transport path setup direction. Other nodes 102B are known as intermediate nodes. In this example, the network 100 includes a transport path 104 (e.g., a LSP) formed by a headend node 102A, a tailend node 102C, and intermediate node 102B.

The nodes 102A-102E are coupled by communication links 106, which can be fiber optic cables, electronics cables, wireless communication links, or the like. The transport path 104 may be bi-directional or co-routed, for example, and may be established by protocols conforming to GMPLS requirements. The headend node 102A may be operably coupled with a source of traffic or data, such as IP traffic including one or more packets, via a communication link 108.

The network 100 may be an OTN and may include a data plane 110 and a control plane 112 as will be appreciated by persons of ordinary skill in the art. A network controller 114 may be coupled with the nodes 102 in the network 100 via the control plane 112 (e.g., and may run software-defined networking and/or GMPLS, in-band and/or out of band) as will be appreciated by a person of ordinary skill in the art. The network controller 114 may be separate from the nodes 102 and may communicate with the nodes 102 via an optical supervisory channel or other out of band communication channel, for example, and may include at least one processor and a non-transitory computer memory coupled with the at least one processor, for example.

It is to be understood that any desired number of nodes 102 may be implemented with the inventive concepts disclosed herein, and in some exemplary embodiments, the network controller 114 may be omitted.

Figure 3:
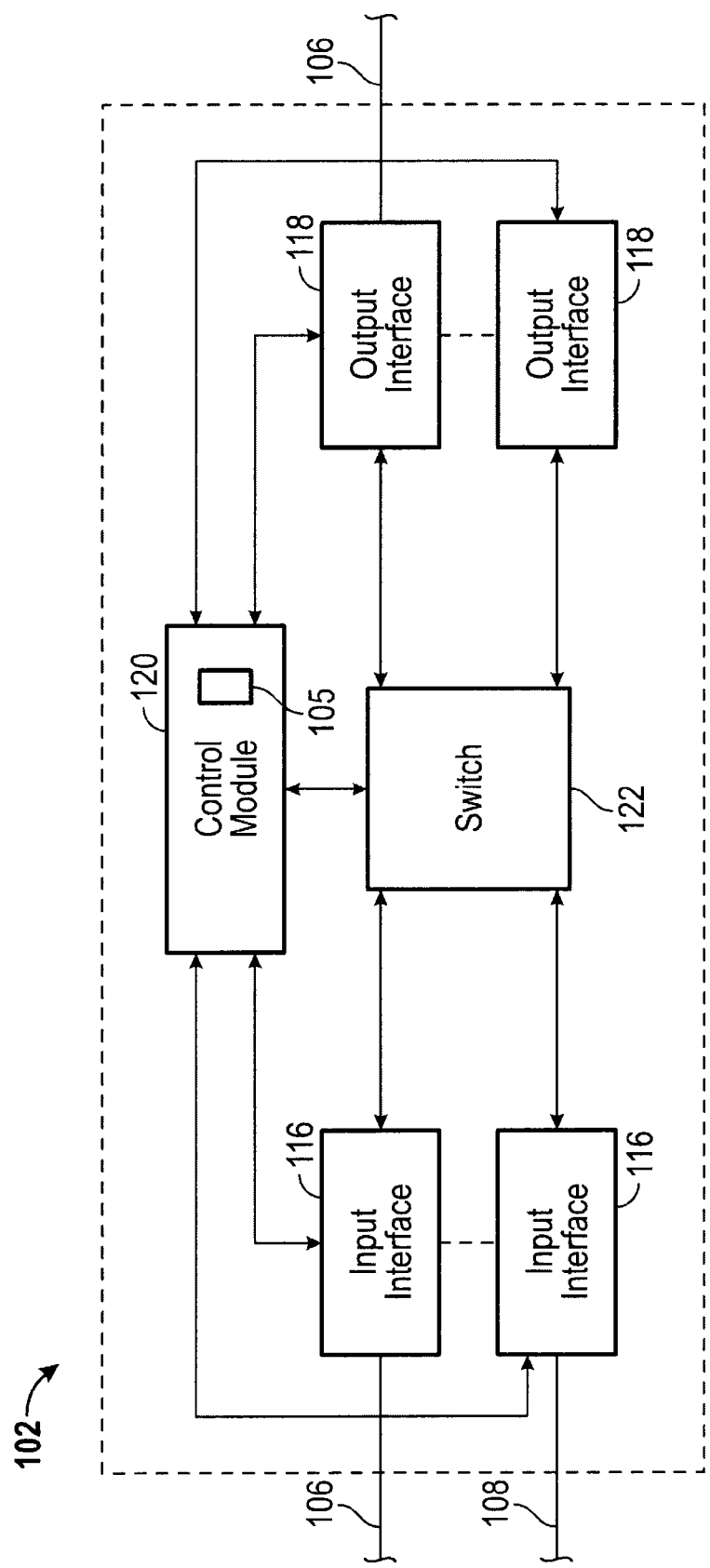
FIG. 3 is a block diagram of an exemplary embodiment of a node of the network of FIG. 2.

Referring now to FIG. 3, an exemplary embodiment of a node 102 according to the inventive concepts disclosed herein is shown. As will be discussed in more detail below, the node 102 is adapted to facilitate the communication of data (which may be referred to herein as "traffic") between nodes 102 in a network (e.g., the network 100 shown in FIG. 2). The node 102 is provided with one or more input interfaces 116, one or more output interfaces 118, a control module 120, and a switch 122. The nodes 102A-E in FIG. 2 can be constructed in a similar manner as the node 102.

In general, the input interfaces 116 are adapted to receive traffic from the network 100 and/or from the communication link 108, and the output interfaces 118 are adapted to transmit traffic to nodes 102 in the network 100 via the links 106. The switch 122 serves to communicate the traffic from the input interface(s) 116, to the output interface(s) 118. The control module 120 serves to control the operations of the input interfaces 116, the output interfaces 118, and the switch 122.

In some exemplary embodiments, the control module 120 may run protocols conforming to GMPLS requirements and can be referred to herein as a control plane. The control plane may use GMPLS protocols to setup one or more transport paths 104 (e.g., LSPs) during a path setup or negotiation. During the negotiation between the control planes of the nodes 102 within the network 100, labels may be allocated for in-band signaling as part of the GMPLS processing, for example.

The node 102 can be implemented in a variety of manners, including commercial installations having one or more backplanes (not shown), racks, and the like. In this example, the input interfaces 116, the output interfaces 118, the control module 120 and the switch 122 are shown implemented as separate devices, which may have their own power supply, local memory and processing equipment. In another example, the node 102 can be implemented as a single device having a shared power supply, memory and processing equipment. Or, in another example, the node 102 can be implemented in a modular manner in which one or more of the input interfaces 116, the output interfaces 118, the control module 120 and the switch 122 share a power supply and/or housing.

The input interfaces 116, and the output interfaces 118 of one node 102 are adapted to communicate with corresponding input interfaces 116, and output interfaces 118 of another node 102 within the network 100 via a communication link 106 (as shown in FIG. 2). Further, an input interface 116 may communicate with an IP-traffic source via the communication link 108. An example of an input interface 116 and/or an output interface 118 is an Ethernet card or optical port. In general, each of the input interfaces 116 and/or the output interfaces 118 may have a unique logical identification, such as an IP address. The communication links 106 can be implemented in a variety of manners, such as a physical link including electrical (e.g., copper wire or coax) and/or optical signal (e.g., optical fiber or other waveguide) carrying capabilities, or as a wireless link. The implementation of the input interfaces 116, and the output interfaces 118 may depend upon the particular type of communication links 106 that the particular input interface 116 and/or output interface 118 is designed to communicate with. For example, one of the input interfaces 116 can be designed to communicate wirelessly with another node 102 within the network 100, while one of the output interfaces 118 of the node 102 can be designed to communicate optically through a fiber-optic link 106. For a particular node 102, the input interfaces 116 can be of the same type or different types; the output interfaces 118 can be of the same type or different types; and the input and output interfaces 116 and 118 can be of the same type or different types.

In accordance with the present disclosure, messages transmitted between the nodes 102A-E, can be processed by circuitry within the input interface(s) 116, and/or the output interface(s) 118 and/or the control module 120. Circuitry could be analog and/or digital, components, or one or more suitably programmed microprocessors (e.g., processor 105, FIG. 3) and associated hardware and software, or hardwired logic. Also, certain portions of the implementations have been described as "components" that perform one or more functions. The term "component," may include hardware, such as a processor, an application specific integrated circuit (ASIC), or a field programmable gate array (FPGA), or a combination of hardware and software. Software includes one or more computer executable instructions that when executed by one or more component cause the component to perform a specified function. It should be understood that the logic sequences described herein are stored on one or more non-transient or non-transitory memory. Exemplary non-transient memory includes random access memory, read only memory, flash memory or the like. Such non-transient memory can be electrically based or optically based. Further, the messages described herein may be generated by the components and result in various physical transformations.

It should be understood that the node 102 can be implemented in a variety of manners including those shown and discussed in U.S. Patent Publication No. 2009/0245289 entitled "Programmable Time Division Multiplexed Switching" the entire content of which is hereby incorporated herein by reference.

Figure 4:
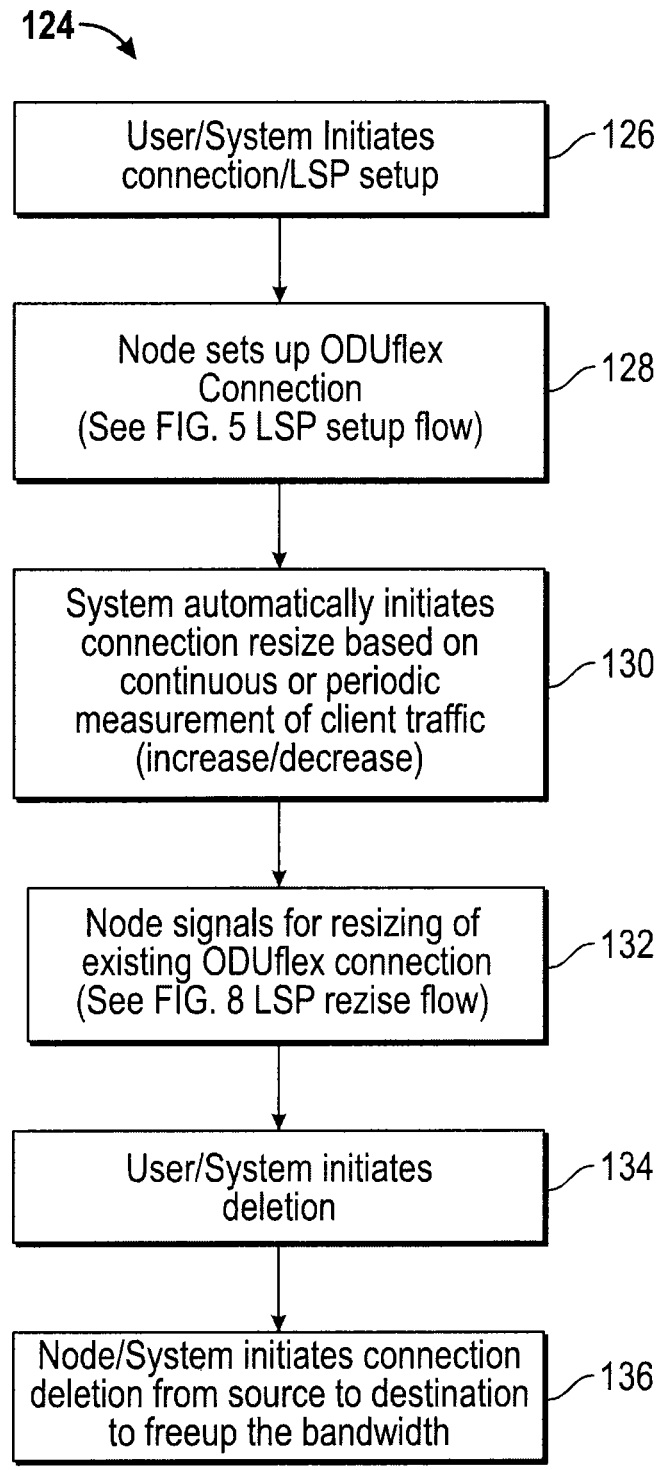
FIG. 4 is a block diagram showing an exemplary logic sequence of a bandwidth reprovisioning method according to the inventive concepts disclosed herein at a connection headend node.

Referring now to FIG. 4, an exemplary logic sequence of a bandwidth provisioning method 124 according to the inventive concepts disclosed herein is shown as an example of life of a connection in a node, such as the headend node 102A. The logic sequence may be carried out by a headend node such as the headend node 102A in this instance, and begins with step 126 where the user (e.g., the node 102) and/or the system (e.g., the network controller 114) initiates a connection or a transport path such as the transport path 104 (e.g., a LSP) setup for a packet or other data flow arriving at the headend node 102A (e.g., via the communication link 108).

In a step 128 the headend node 102A sets up a transport path 104 which may include an optical connection carrying at least one variable data or bandwidth container such as those conforming to ODUflex requirements as will be described in more detail with reference to FIGS. 5-6 below. The transport path 104 may have a set or reserved bandwidth, which may be initially set by the headend node 102A based on the bandwidth of the incoming traffic at the headend node 102A (e.g., via the link 108), for example.

In a step 130, the node 102A or the network controller 114 initiates (e.g., automatically) a transport path 104 resize based on continuous and/or periodic measurement of incoming traffic at the headend node 102A (e.g., increase and/or decrease). In some exemplary embodiments, the transport path 104 resize may be initiated based on a preset threshold (e.g., current traffic bandwidth varying by 0.1% or more, 5% or more, 20%, 100% or more, including all integers and fractions therebetween, over a period of time), while in some exemplary embodiments, the transport path 104 resize may be carried out periodically, intermittently, and/or continuously.

In a step 132, the headend node 102A signals for resizing of the bandwidth of the transport path 104. Step 132 will be described in more detail with reference to FIGS. 8-9 below.

In a step 134, the user (e.g., the headend node 102A) or the system (e.g., the network controller 114) initiates deletion of timeslots to free up previously reserved bandwidth for the transport path 104 (e.g., by removing one or more timeslots from one or more ODUflex containers). In some exemplary embodiments, where the incoming traffic at the headend node 102A has increased, one or more timeslots may be added to one or more ODUflex containers to increase the reserved bandwidth for the transport path 104, as will be appreciated by persons of ordinary skill in the art having the benefit of the instant disclosure.

In a step 136, the headend node 102A or the system (e.g., the network controller 114) initiates a connection deletion sequence from the headend node 102A to the tailend node 102C to free up bandwidth previously provisioned for the transport path 104.

Figure 5:
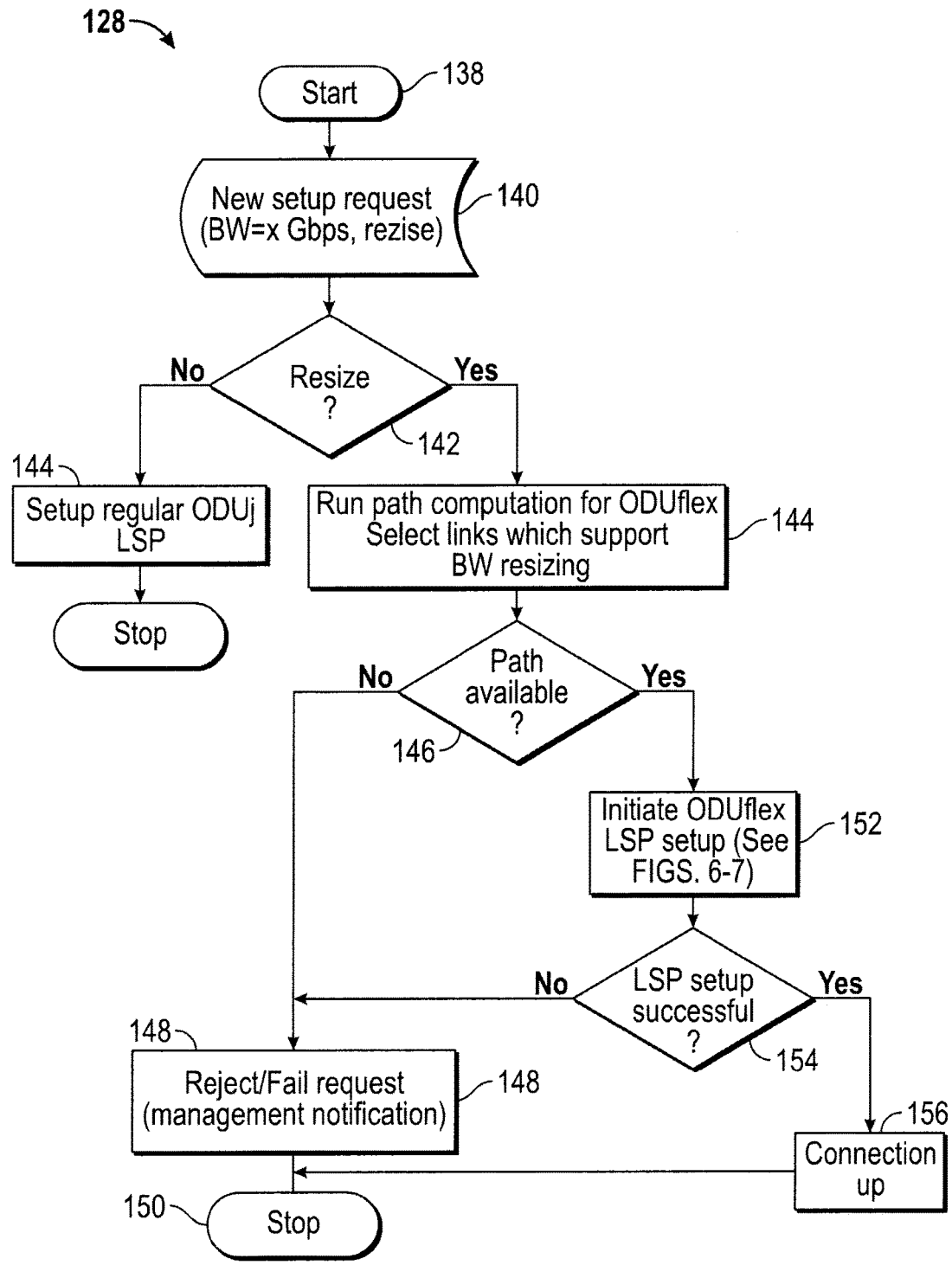
FIG. 5 is a block diagram showing adjustable bandwidth transport path setup logic sequence of a bandwidth reprovisioning method according to the inventive concepts disclosed herein.
Figure 6:
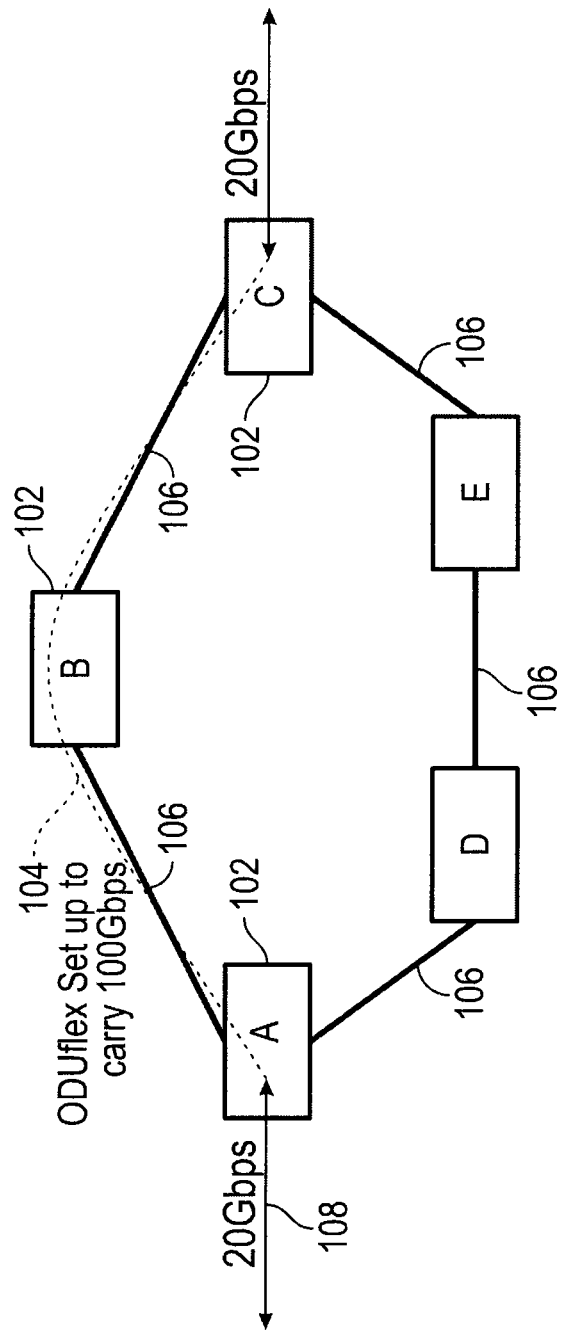
FIG. 6 is a block diagram of an exemplary embodiment of a transport path setup from a headend node to a tailend node according to the inventive concepts disclosed herein.

Referring now to FIG. 5, shown therein is a transport path 104 (e.g., ODUflex LSP) setup by a headend node 102A (e.g., used at step 128 of FIG. 4). The transport path 104 setup starts at a step 138, and includes a step 140 where the headend node 102A generates a new setup request for a transport path 104 (e.g., a LSP) with a bandwidth of "X" Gbps (e.g., 10 Gbps). The initially setup bandwidth of the transport path 104 may correspond to the bandwidth of the incoming traffic at the headend node 102A, e.g., may be substantially equal to the bandwidth of the incoming traffic at the headend node 102A.

In a decision step 142, the headend node 102A determines if a resize is to be conducted for the transport path 104 (e.g., whether to set up an adjustable bandwidth transport path 104, such as an ODUflex transport path 104) based on the measured bandwidth of the incoming traffic at the headend node 102A. If a resize is not to be conducted, in a step 144 the headend node 102A sets up a regular ODUj transport path 104. If a resize is to be conducted, the headend node 102A computes an adjustable bandwidth transport path 104 (e.g., a LSP including at least one ODUflex container) and select links 106 along the computed adjustable bandwidth transport path 104 that support dynamic bandwidth adjustment or resizing by varying the number of time slots used by ODUflex containers carried over the links 106 forming the adjustable bandwidth transport path 104 (e.g., via GMPLS signaling).

In a decision step 146, the headend node 102A determines if the computed transport path 104 is available. If the computed transport path 104 is not available, the headend node 102A rejects the request, and in a step 148 notifies a network controller (e.g., the network controller 114) that the request was rejected or failed, and the sequence stops at step 150.

Figure 7:
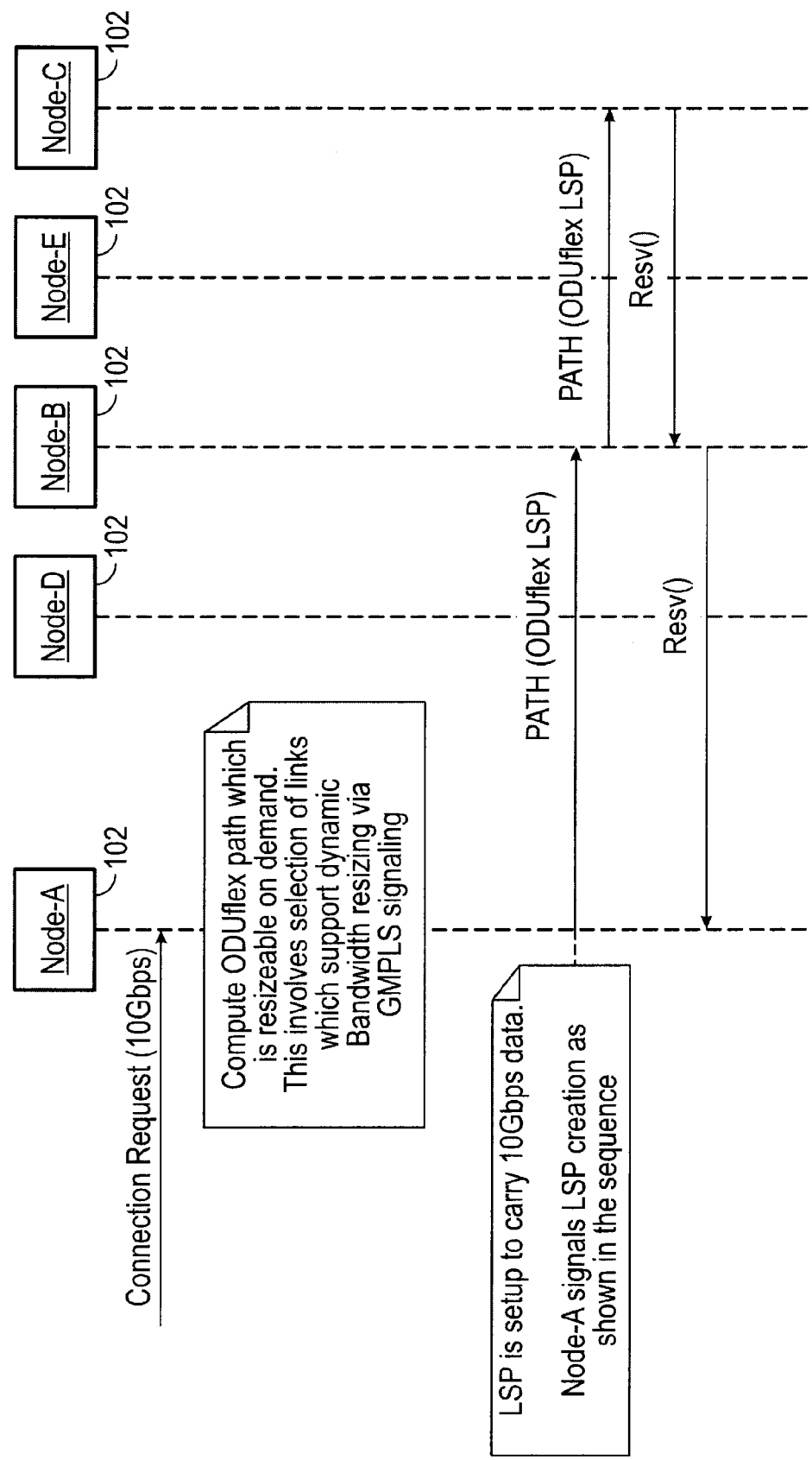
FIG. 7 is a block diagram showing an exemplary transport path setup logic sequence according to the inventive concepts disclosed herein.

If the computed transport path 104 is available, the headend node 102A initiates the transport path 104 setup in a step 152. An exemplary embodiment of step 152 is detailed in FIGS. 6-7. To set up the transport path 104, the headend node 102A (node A) receives a connection request for an initial bandwidth, e.g., a 10 Gbps connection. The headend node 102A may then compute a transport path 104 which may be resizable on demand. The headend node 102A may set up the transport path 104 (e.g., an ODUflex LSP) by selecting links 106 which support dynamic bandwidth resizing via protocols conforming to GMPLS signaling. The transport path 104 (via ODUflex in this instance) may be set up as a LSP and is initially set up to carry 10 Gbps of data. The headend node 102A signals the creation of the transport path 104 to the remaining nodes 102 in the network 100 as described in step 132 (FIG. 4) above. It is to be understood that any suitable adjustable data container may be used to set up the transport path 104.

Returning to FIG. 5, in a decision step 154 the headend node 102A determines if the setup of the transport path 104 was successful. If the setup was not successful, the sequence cycles to step 148. If the transport path 104 setup was successful, the transport path 104 is initiated in a step 156, and the sequence stops at step 150.

Figure 8:
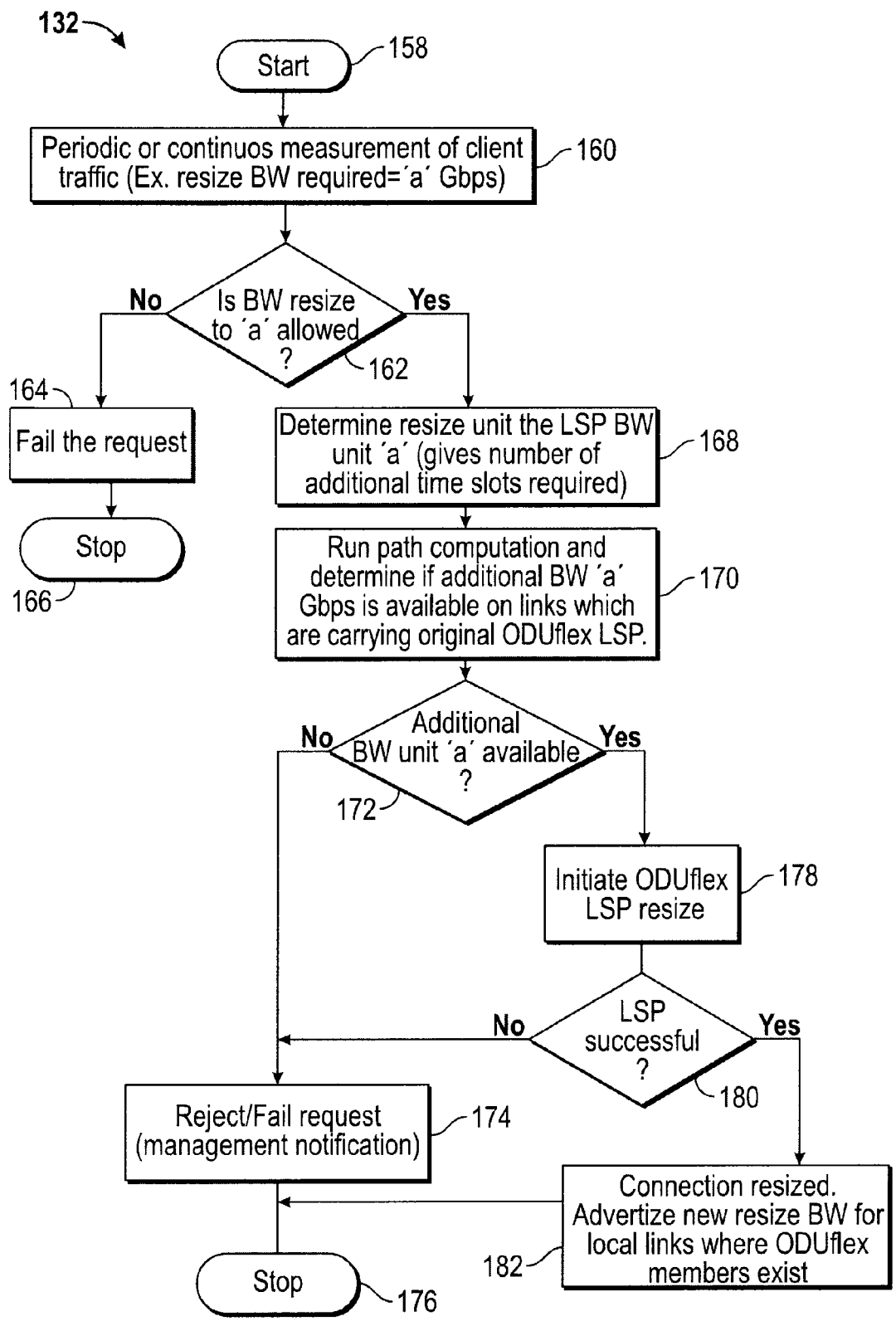
FIG. 8 is a diagram of a label switched path resize sequence from a headend node to a tailend node of the network of FIG. 6.
Figure 9:
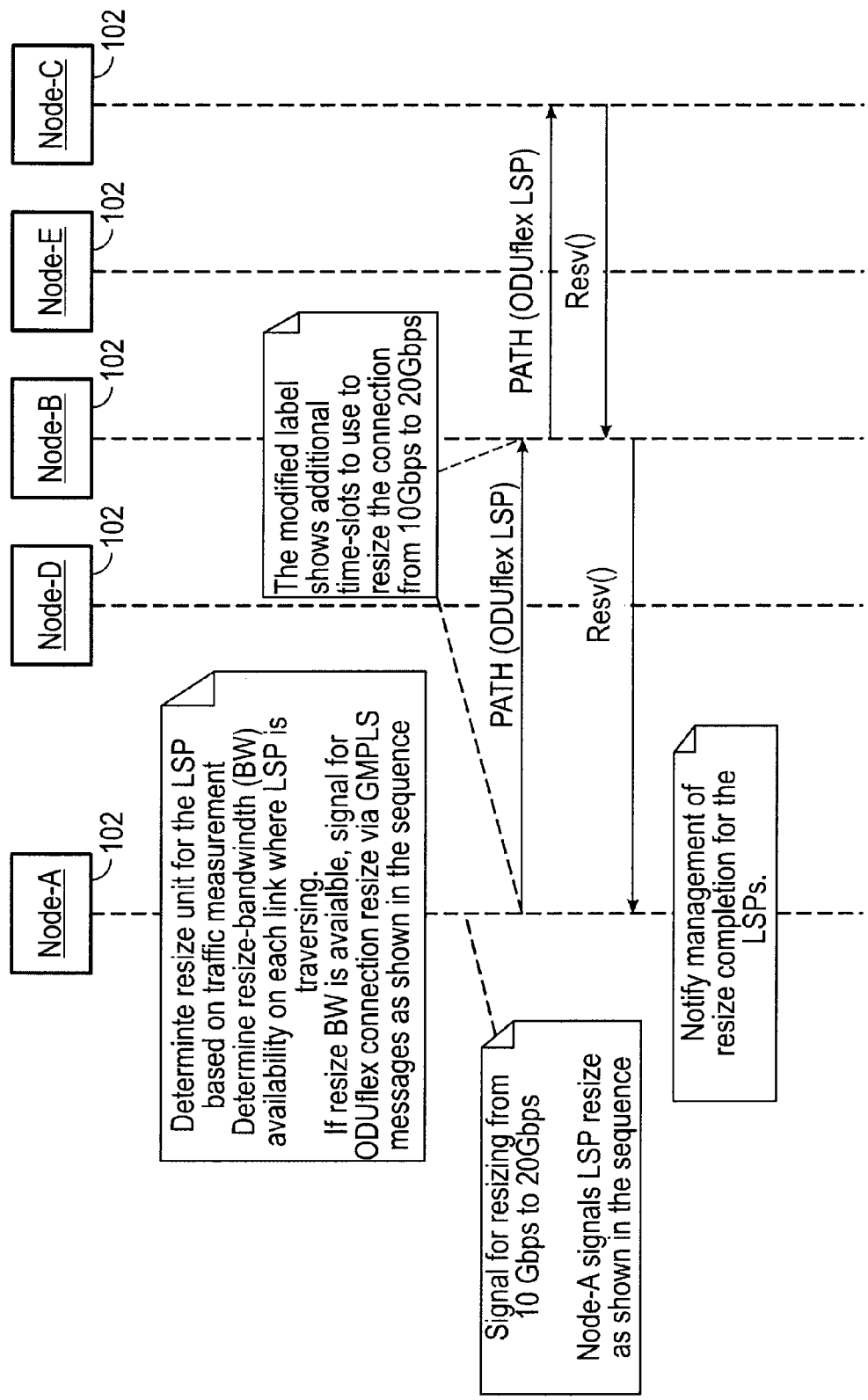
FIG. 9 is a diagram of a label switch path resize signaling sequence from the headend node to the tailend node of the network of FIG. 6.

Referring now to FIGS. 8-9, shown therein is an exemplary path resize sequence and a path resize signaling sequence for resizing the bandwidth of the transport path 104 (e.g., used at step 132 of FIG. 4) according to the inventive concepts disclosed herein. The logic sequence starts at step 158.

In a step 160, the headend node 102A measures the bandwidth of incoming traffic to the headend node 102A (e.g., via the link 108). For example, the headend node 102A may continuously, periodically, and/or intermittently measure the bandwidth of incoming traffic on the link 108. In some exemplary embodiments, the headend node 102A may measure the bandwidth of incoming traffic at a different instant of time including a first time T1, and a later second time T2, and may store the measured bandwidth and compute the peak and/or the average bandwidth of the incoming traffic for the period of time between T1-T2. For this example it is assumed that the average bandwidth over the period T1-T2 (e.g. a time period varying from a few seconds to 5 minutes, or more) increased by "a" Gbps. It is to be understood that the incoming traffic bandwidth may increase and/or decrease, and such increase and/or decrease may be above or below a preset threshold (e.g., network operator or user specified) in some exemplary embodiments. Further, in some exemplary embodiments, the incoming bandwidth may remain the same or substantially the same over the time period T1-T2 and in such case the bandwidth of the transport path 104 may not be resized.

In a decision step 162, the headend node 102A determines if a bandwidth adjustment of the transport path 104 (e.g., increasing the bandwidth of the transport path by "a" Gbps) is allowed (e.g., is the transport path 104 an ODUj transport path 104 or an ODUflex transport path 104). If a bandwidth adjustment is not allowed, the sequence moves to a step 164 where the headend node 102A fails the request, and ends in a step 166.

If a bandwidth adjustment is allowed (e.g., the transport path 104 is an adjustable bandwidth or ODUflex transport path 104), the sequence continues to a step 168 where the headend node 102A determines the resize unit "a" for the transport path 104, which may give the headend node 102A the number of additional timeslots required to provide additional bandwidth of "a" Gbps on the transport path 104 by adding at least one timeslot to an ODUflex container carried over the transport path 104, for example. In some embodiments one or more reserved timeslots may be deleted from an ODUflex container carried over the transport path 104, for example, where the incoming traffic decreases over the period of time T1:T2.

In a step 170, the headend node 102A may run a transport path 104 computation and may determine if additional bandwidth of "a" Gbps is available on the links 106 that carry the transport path 104. If the additional bandwidth unit "a" Gbps is not available on the links 106, a decision step 172 causes the sequence to branch to a step 174 where the request for resizing is rejected or fails and the network controller 114 is notified of the resize request failing. The sequence ends in a step 176.

If the additional bandwidth unit "a" Gbps is available on the links 106, in a step 178 the headend node 102A initiates resizing of the transport path 104. For example, a node 102 (e.g., the node 102B) may add at least one timeslot to at least one ODUflex container carried over the transport path 104 so as to increase the bandwidth of the transport path 104 by "a" Gbps. Further, in some exemplary embodiments, the bandwidth of the transport path 104 may be reduced by removing at least one timeslot from at least one ODUflex container carried via the transport path 104.

In a decision step 180, the headend node 102A determines if the transport path 104 resize was successful. If not, the logic cycles to step 174. If the transport path 104 resize is successful, the headend node 102A determines that the transport path 104 has been resized in a step 182 and sends out a signal (e.g., a bandwidth advertising message) to advertise the resized bandwidth for the transport path 104 (including local links 106 in the network 100 where ODUflex members exist) to the network controller 114.

As shown in FIG. 9, in one exemplary embodiment where the transport path 104 conforms to the requirements of ODUflex LSP, a path resize signaling sequence from the headend node 102A to the tailend node 102C may include the headend node 102 (node A), determining the resize unit for the transport path 104 based at least partially on traffic measurement. The headend node 102A may also determine the resize bandwidth availability on each link 106 where the transport path 104 is travelling. If resize bandwidth is available, the headend node 102A may signal for an ODUflex LSP resize from 10 Gbps to 20 Gbps via GMPLS messages, for example, and may notify the network controller 114 of resize completion for the transport path 104. An intermediary node 102 (node 102B in the example shown in FIG. 9) may receive traffic with a modified GMPLS label which shows a number of timeslots to add to each ODUflex container so as to resize the transport path 104 from 10 Gbps to 20 Gbps. The node 102B resizes the transport path 104 accordingly, and may send one or more messages to the network controller 114 and/or to the nodes 102 in the network 100 to indicate that the transport path 104 has been resized.

The inventive concepts described herein above dynamically reprovision bandwidth in P-OTN networks based on the measured bandwidth of incoming traffic, thereby generating significant bandwidth savings as compared to existing static bandwidth provisioning methods.

As will be appreciated by persons of ordinary skill in the art, dynamic bandwidth provisioning as described herein results in freeing up bandwidth (e.g., ODUflex timeslots) which may then be used by the network provider for other services for the same customer, or for services for other customers. While implementations have been described in the context of an optical network, this need not be the case. These implementations may apply to an electronic network using copper cabling, or even a wireless network, in some exemplary embodiments.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Also, certain portions of the implementations may have been described as "components" or "circuitry" that perform one or more functions. The term "component" or "circuitry" may include hardware, such as a processor, an application specific integrated circuit (ASIC), or a field programmable gate array (FPGA), or a combination of hardware and software.

In addition, information regarding the optical channel data unit label switched paths can be stored and processed in a distributed fashion, or in a centralized fashion. The time slot information can be stored in a distributed fashion (distributed storage having multiple memory/storage devices) and processed in a distributed manner preferably by using a hop-to-hop processing. In another implementation, the distributed storage may be replaced by a centralized memory that stores the time slot information for all, or a subset, of the nodes 102. In this situation, the nodes 102 may include communication paths to obtain the connection information from the centralized memory.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

What is claimed is:

1. A method, comprising the steps of:
   measuring, by circuitry of a computer system, a peak of a first bandwidth of data traffic of a transport path over a time period, the transport path passing through a plurality of nodes and conforming to a protocol using a number of time slots to allocate a second bandwidth to the transport path; and
   passing a signal, from the computer system to at least one of the nodes of the transport path, the signal including at least one instruction that when executed by circuitry of the at least one node causes a change to the number of time slots allocated to the transport path based upon the measured peak of the first bandwidth of data traffic, wherein the change to the number of time slots is an increase in the number of time slots by an added number of time slots, the signal being a GMPLS label including the added number of time slots to each of a plurality of ODUflex containers.

2. The method of claim 1, wherein the computer system is a component of at least one of the nodes of the transport path.

3. The method of claim 1, wherein the step of passing the signal is responsive to a determination that the first bandwidth differs from the second bandwidth by an amount exceeding a preset threshold.

4. The method of claim 3, wherein the preset threshold is between about 0.1% and about 100%.

5. The method of claim 1, wherein the time period is a first time period, and the method further comprises the step of measuring, by circuitry of the computer system, a third bandwidth of data traffic of the transport path over a second time period, and the step of passing the signal is responsive to a determination that the first bandwidth differs from the third bandwidth by an amount exceeding a preset threshold.

6. The method of claim 5, wherein the preset threshold is between about 0.1% and about 100%.

7. The node of claim 1, wherein the transport path is a Label Switched Path (LSP).

8. A node, comprising:
   an input interface for receiving traffic from a first link;
   an output interface for transmitting traffic to a second link;
   a switch for communicating the traffic from the input interface to the output interface; and
   a control module controlling the input interface, the output interface, and the switch, the control module:
   measuring a peak of a first bandwidth of data traffic of a transport path over a time period, the transport path passing through a plurality of nodes and conforming to a protocol using a number of time slots to allocate a second bandwidth to the transport path; and
   passing a signal, from the node to at least one of the plurality of nodes of the transport path, the signal including at least one instruction that when executed by circuitry of the at least one of the plurality of nodes causes a change to the number of time slots allocated to the transport path based upon the measured peak of the first bandwidth of data traffic, wherein the change to the number of time slots is an increase in the number of time slots by an added number of time slots, the signal being a GMPLS label including the added number of time slots to each of a plurality of ODUflex containers.

9. The node of claim 8, wherein the node passes the signal in response to a determination that the first bandwidth differs from the second bandwidth by an amount exceeding a preset threshold.

10. The node of claim 9, wherein the preset threshold is between about 0.1% and about 100%.

11. The node of claim 8, wherein the time period is a first time period, and wherein the control module further measures a third bandwidth of data traffic of the transport path over a second time period, and passes the signal in response to a determination that the first bandwidth differs from the third bandwidth by an amount exceeding a preset threshold.

12. The node of claim 11, wherein the preset threshold is between about 0.1% and about 100%.

13. The node of claim 8, wherein the transport path is a Label Switched Path (LSP).

\* \* \* \* \*